United States Patent
Cherukuri et al.

(10) Patent No.: US 8,990,506 B2
(45) Date of Patent: Mar. 24, 2015

(54) REPLACING CACHE LINES IN A CACHE MEMORY BASED AT LEAST IN PART ON CACHE COHERENCY STATE INFORMATION

(75) Inventors: Naveen Cherukuri, San Jose, CA (US); Dennis W. Brzezinski, Sunnyvale, CA (US); Ioannis T. Schoinas, Portland, OR (US); Anahita Shayesteh, San Jose, CA (US); Akhilesh Kumar, Sunnyvale, CA (US); Mani Azimi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 550 days.

(21) Appl. No.: 12/639,191

(22) Filed: Dec. 16, 2009

(65) Prior Publication Data
US 2011/0145506 A1 Jun. 16, 2011

(51) Int. Cl.
*G06F 12/00* (2006.01)
*G06F 12/12* (2006.01)
*G06F 12/08* (2006.01)

(52) U.S. Cl.
CPC .......... *G06F 12/121* (2013.01); *G06F 12/084* (2013.01); *G06F 12/126* (2013.01)
USPC .......... 711/133; 711/144; 711/145; 711/122; 711/124

(58) Field of Classification Search
CPC G06F 12/121; G06F 17/30902; G06F 12/122
USPC .......................... 711/133, 144, 145, 122, 124
See application file for complete search history.

(56) References Cited

U.S. PATENT DOCUMENTS

| 6,009,488 | A | 12/1999 | Kavipurapu |
| 6,098,152 | A | 8/2000 | Mounes-Toussi |
| 6,223,256 | B1 | 4/2001 | Gaither |
| 6,405,290 | B1 | 6/2002 | Arimilli et al. |
| 6,425,057 | B1 * | 7/2002 | Cherkasova et al. .......... 711/134 |
| 6,829,679 | B2 | 12/2004 | DeSota et al. |
| 7,415,575 | B1 | 8/2008 | Tong et al. |

(Continued)

FOREIGN PATENT DOCUMENTS

| JP | 01-255944 | 10/1989 |
| JP | H11-039218 | 2/1999 |

(Continued)

OTHER PUBLICATIONS

European Patent Office, Office Action mailed Jun. 28, 2011 in European application No. 10195242.2.

(Continued)

*Primary Examiner* — Hong Kim
(74) *Attorney, Agent, or Firm* — Trop, Pruner & Hu, P.C.

(57) ABSTRACT

In one embodiment, the present invention includes a cache memory including cache lines that each have a tag field including a state portion to store a cache coherency state of data stored in the line and a weight portion to store a weight corresponding to a relative importance of the data. In various implementations, the weight can be based on the cache coherency state and a recency of usage of the data. Other embodiments are described and claimed.

20 Claims, 8 Drawing Sheets

| Tag Address | State | Weight Counter | Attribute |
|---|---|---|---|
| | Shared (single) | 3 | |
| | Modified | 2 | |
| | Shared (Duplicate) | 1 | |

(56) References Cited

U.S. PATENT DOCUMENTS

| | | | |
|---|---|---|---|
| 2002/0053006 A1 | 5/2002 | Kawamoto et al. | |
| 2003/0177313 A1 | 9/2003 | Iyer et al. | |
| 2004/0039880 A1* | 2/2004 | Pentkovski et al. | 711/146 |
| 2005/0033919 A1 | 2/2005 | Borkenhagen | |
| 2005/0108478 A1 | 5/2005 | Holloway et al. | |
| 2005/0114605 A1 | 5/2005 | Iyer | |
| 2005/0240736 A1 | 10/2005 | Shaw | |
| 2006/0149757 A1* | 7/2006 | Bird et al. | 707/100 |
| 2006/0282620 A1* | 12/2006 | Kashyap et al. | 711/128 |
| 2007/0006230 A1 | 1/2007 | Neiger et al. | |
| 2007/0198779 A1* | 8/2007 | Wang | 711/136 |
| 2008/0040554 A1 | 2/2008 | Zhao et al. | |
| 2008/0075101 A1 | 3/2008 | Illikkal | |
| 2008/0215822 A1 | 9/2008 | Ajanovic et al. | |
| 2008/0235457 A1 | 9/2008 | Hasenplaugh et al. | |
| 2008/0235487 A1 | 9/2008 | Illikkal et al. | |
| 2009/0106499 A1 | 4/2009 | Aoki et al. | |
| 2009/0254712 A1 | 10/2009 | Cherukuri et al. | |

FOREIGN PATENT DOCUMENTS

| | | |
|---|---|---|
| JP | 2002-049529 | 2/2002 |
| JP | 2002-140234 | 5/2002 |
| JP | 2005-301387 | 10/2005 |
| JP | 2009-098934 | 5/2009 |
| TW | 200908009 A | 2/2009 |
| TW | 200910100 A | 3/2009 |
| WO | WO9841923 | 9/1998 |

OTHER PUBLICATIONS

U.S. Patent and Trademark Office, Office Action mailed Apr. 26, 2011 with Reply filed Jul. 15, 2011 in U.S. Appl. No. 12/061,027.

Intel, "An Introduction to the Intel Quickpath Interconnect," Jan. 2009, pp. 1-22.

Volkmar Uhlig, et al., "Performance of Address-Space Multiplexing on the Pentium," 2002, pp. 1-15.

Aravind Menon, et al., "Diagnosing Performance Overheads in the Xen Virtual Machine Environment," Jun. 2005, pp. 1-11.

Gil Neiger, et al., "Intel® Virtualization Technology: Hardware Support for Efficient Processor Virtualization," Aug. 10, 2006, pp. 167-179.

Japanese Patent Office, Office Action mailed Dec. 18, 2012 in Japanese application. 2010-246189.

Japanese Patent Office, Office Action mailed Aug. 28, 2012 in Japanese application No. 2010-246189.

State Intellectual Property Office of the People's Republic of China, Office Action and Search Report mailed Mar. 6, 2013 in Chinese application No. 201010594505.7.

Taiwanese Patent and Trademark Office, Office Action and IPO Search Report mailed Jul. 17, 2013 in Taiwanese application No. 099137476.

European Patent and Trademark Office, Office Action mailed Aug. 23, 2013 in European application No. 10195242.2.

Chinese Patent and Trademark Office, Office Action and IPO Search Report mailed May 16, 2014 in Chinese application No. 201010594505.7.

* cited by examiner

| Tag Address | State | Weight Counter | Attribute |
|---|---|---|---|
| | Shared (single) | 3 | |
| | Modified | 2 | |
| | Shared (Duplicate) | 1 | |

REPLACING CACHE LINES IN A CACHE MEMORY BASED AT LEAST IN PART ON CACHE COHERENCY STATE INFORMATION

BACKGROUND

A modern computer system typically has one or more processors or central processing units (CPUs) at the heart of the system. These processors execute instructions on data to perform requested operations. Processors operate at extremely high frequencies. To have data readily accessible to the processors, the data can be stored in a cache memory. Different implementations of cache memories exist. Oftentimes, a small cache memory may be located on the same semiconductor die as the processor, providing a close and fast source of data. Some memory architectures can have multiple levels of a memory hierarchy, with each higher level further away from the processor, until reaching a system memory and/or mass storage device.

While these higher levels of a memory hierarchy can store large amounts of data, the access times are vastly slower than the access times for a lower level cache memory. Accordingly, a large latency is incurred when needed data is available at these higher levels. Thus, recently and/or frequently accessed data may be stored in a lower level of a memory hierarchy.

Cache memories are typically implemented using a given replacement scheme. Many replacement schemes are according to a least recently used (LRU) policy in which a least recently used cache line can be selected as a victim cache line to be replaced with new data to be inserted into the cache. As larger processors including more cores on a single die and different cache architectures including shared cache architectures become available, a LRU replacement scheme may not accurately reflect the true value of the data, and thus it is possible for needed data to be unavailable, causing a long latency to obtain the data.

DETAILED DESCRIPTION

Figure 1:
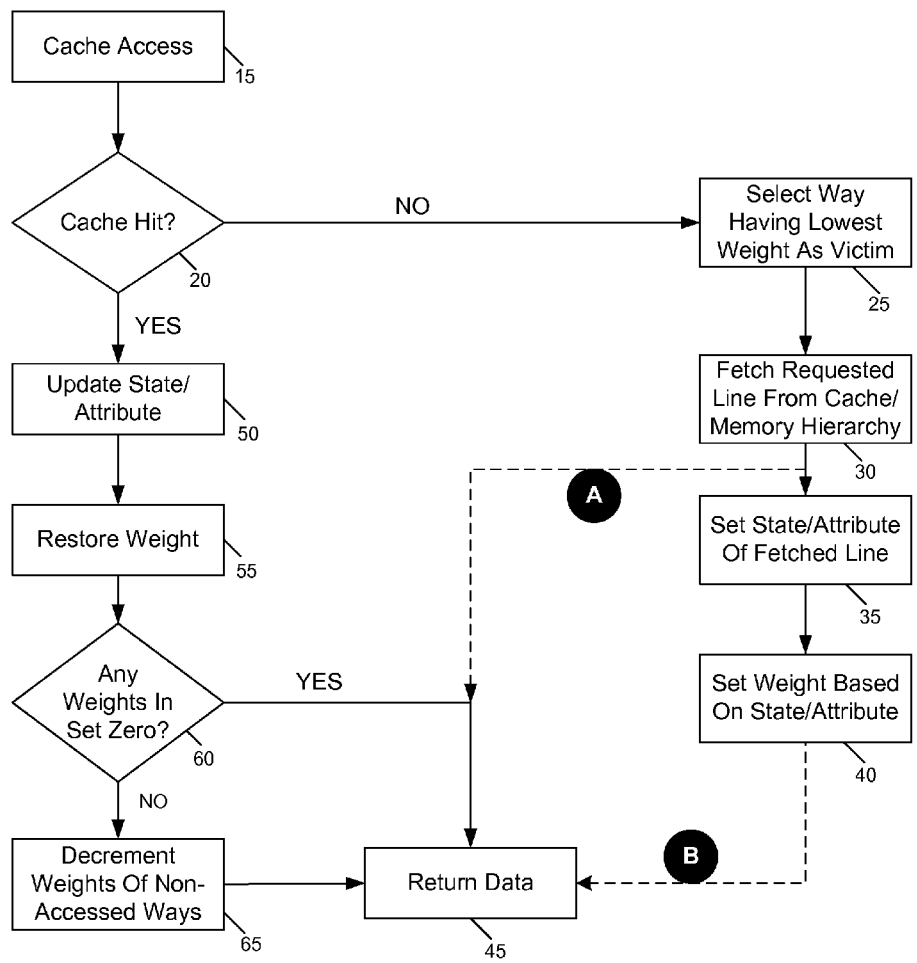
FIG. 1 is a flow diagram of a method for accessing a cache in accordance with an embodiment of the present invention.

In various embodiments, a cache replacement technique may be used to age data stored in cache lines, based on criticality and recency of use. To realize this technique, a tag portion of each cache line may include weight and/or attribute information. This weight value may be stored in a weight field of the tag portion and the attribute value stored in an attribute field of the tag field portion. This information can be stored at the time of allocation and later updated as cache activity occurs. For purposes of discussion the term weight may be used generally to refer to both weight and attribute. In one embodiment, the assigned weight may be proportional to data criticality, as determined by the coherence state of the cache line, e.g., of a modified, exclusive, shared, and invalid (MESI) or other cache coherency protocol. In other embodiments, different hardware or software mechanisms may provide other information (generally attribute information) on which to base a criticality decision.

Embodiments can be used in many different types of cache systems. As one example, a cache system that can benefit from an embodiment of the present invention may be an adaptive cache of a chip multiprocessor (CMP) such as a large scale CMP or a terascale system. Other embodiments may be used in connection with other cache architectures such as a last level cache (LLC) of an inclusive cache hierarchy. Other cache architectures both inclusive and otherwise may also benefit from an embodiment of the present invention.

For explanation purposes, weighting of cache lines may be in accordance with the different states of a MESI protocol, although in many embodiments additional attribute information may be considered in determining a weight for a line. For purposes of discussion, understand that an adaptive cache may be a shared cache that includes banks each associated with a processor core and which can act as both private cache and shared cache. Details of an example adaptive cache will be described further below. The identity of a given line as being shared or private, and the number of cores including the cache line can be determined based on a state of a directory, which may also be part of the shared cache.

In such an adaptive cache system, weighting of cache lines may be based on the cache coherency state of each cache line. More specifically, in one embodiment a highest weight may be assigned to a single data element shared by multiple cores (i.e., in the shared (S) state), since losing this data would have a large impact (e.g., multiple processor stalls). Modified (M) and exclusive (E) lines may be grouped next in the relative order of importance. These lines are single data elements used by one core, but losing this data requires a trip to main memory (which can result in performance loss, memory bandwidth demand increase, power consumption at analog input/output (I/O)) circuitry and so forth. Finally, in this replacement scheme, duplicate lines shared by multiple cores are given least importance, and hence can be biased for eviction. Note that such duplicate lines may be of the shared state, but located in multiple private caches. A core losing such a line from a private cache can fetch it from a remote private cache instead of going to memory. For instance, if accessing memory is 5 times more expensive (based on latency, power or any other metric) than accessing a remote level two (L2) cache, it may be prudent to keep five copies of more critical lines such as a single shared line or M or E lines than caching five copies of the same line. Since duplicate lines are biased toward eviction, eventually one copy remains on-die and it will inherit the highest importance. A similar weighting scheme may be applicable for other cache architectures such as an inclusive cache hierarchy. However, duplicate lines are generally not available in such architectures and thus may not be part of a weighting scheme.

Thus in general, weight assignment can be done in a systematic way that reflects the relative cost of acquiring a line. For example, assume that the optimization metric is miss latency. Furthermore, assume that it takes 50 cycles to fetch block A and 150 cycles to fetch block B. In this case, avoiding one miss to block B is worth three times as much in terms of access latency impact as avoiding one miss to block A. Accordingly, the weight of block B can be set to be three times as high as the weight of block A to reflect the cost ratio of the two blocks.

In some embodiments, cache access patterns can be monitored and adaptive adjustments may be made for optimal cache allocation. For simplicity, the examples described here use cache coherence states to define relative importance. Techniques in accordance with an embodiment of the present invention can be used to provide a cache quality of service (QoS) abstraction to software, to thus tailor cache allocation on an application-specific basis. As one example, software can provide a hint with a memory access request indicating the criticality of the associated data. For example, a priority can be set at a page level via a page attribute that is provided with a request to the cache, or user-level instructions of an instruction set architecture (ISA), e.g., a load such as a qualified load, may include information regarding a criticality of the data. For example, in QoS systems in a virtual machine architecture in which an application executed for a user having a higher priority (e.g., due to greater payments for system use), attribute information regarding this priority or criticality can be provided to thus enable weighting of cache lines for such application with a greater weight. Thus user-level control of criticality (e.g., by programmer or compiler) can provide attribute information.

When a cache line is installed, the weight may be set according to the relative importance of the cache line. A higher weight implies longer residence, and thus allocation is based on cache line importance. On a cache hit, the weight of the accessed line may be restored and the weight of all other cache lines in the set decremented. This step combines recency (like LRU) with cache line importance, implying stale high priority lines will be flushed out naturally. When at least one line within a set has a weight decayed to zero, the decrementing may be temporarily suspended until this condition vanishes. In other words, as the least useful line (future victim) has already been identified, there is no need to continue with the aging process (although such decrementing is not precluded). Invalid cache lines (e.g., due to snoops) may have their corresponding weight set to 0, as these are the least useful lines. On a cache miss, the line with the lowest weight (e.g., least useful line) may be evicted. Note that a value of 0 being the lowest weight is merely a convention, and is the convention that highest weight corresponds to longest cache residence. Other conventions, for instance, lowest weight being more important can be used.

Referring now to FIG. 1, shown is a flow diagram of a method for accessing a cache in accordance with an embodiment of the present invention. As shown in FIG. 1, method 10 may be executed on access to a cache for requesting data. In one embodiment, method 10 may be implemented at least in part using a cache controller or other logic of a cache memory. As will be further described below, embodiments may be implemented in different cache architectures such as a shared cache, an adaptive cache, an inclusive cache hierarchy or so forth. As seen in FIG. 1, method 10 may begin by receiving a cache access request (block 15). Assume for purposes of discussion that this request is a read request from a processor core. It next may be determined whether a cache hit occurs (diamond 20). If no hit occurs, meaning that the requested data is not stored in a cache line of the cache memory, control passes to block 25, where a way having the lowest weight may be selected as a victim cache line. That is, a set may have N ways (e.g., N cache lines), and the one of these cache lines having a lowest weight as reflected in a weight portion of its tag field may be selected as the victim. If multiple ways or cache lines have the lowest weight, any one of these lines can be selected as a victim. Note further that it is possible for multiple cache lines to have the same weight.

Because the access request missed in the cache, the requested line may be fetched from another portion of the memory hierarchy (block 30). This other portion may be another cache memory, or higher portions of the hierarchy, e.g., system memory or mass storage device. When the data is retrieved, different implementations are possible. In one implementation it is possible to directly return the data to the requesting core at block 45, to reduce latency, before loading the cache line (locally) and setting its state information. In other implementations it is possible to first insert the incoming data into the evicted line. To do so, a state/attribute of the fetched line may be set (block 35). This state/attribute may include a MESI coherence state and attribute information such as described above. The state/attribute of received line can be indicated as a part of the incoming response, or it can be generated by the receiving cache automatically, depending on a given embodiment and coherence protocol. Further, based on the identified state/attribute, a weight may be set for the cache line (block 40). As will be discussed further below, the weight for the line may be set with reference to information in a weight table, which may be a programmable weight table that associates weight values with each possible state/attribute combination. In the examples discussed above, the cache coherency state may indicate the attribute of the cache line. Then the data may be returned at block 45.

Referring still to FIG. 1, if instead a cache hit occurs at diamond 20, control passes to block 50, where the state/attribute of the cache line may be updated. Such an update may not occur if the state or attribute of the line does not change as a result of the access. In any event, the weight of the cache line may be restored (block 55). That is, because this line has now been accessed, its weight may be reset to the corresponding weight of the state/attribute of the line. Note that this restored weight may or may not be the same as its original weight when inserted into the cache memory, due to possible changes in its state/attribute during residency in the cache.

Still referring to FIG. 1, it may then be determined whether any weight for the lines of the set are at a zero value (diamond 60). If so, the requested data may be returned directly at block 45. Otherwise, the weights for the non-accessed ways of the set may be decremented (block 65) before returning the data. While shown with this particular implementation in the embodiment of FIG. 1, the scope of the present invention is not limited in this regard.

Figure 2:
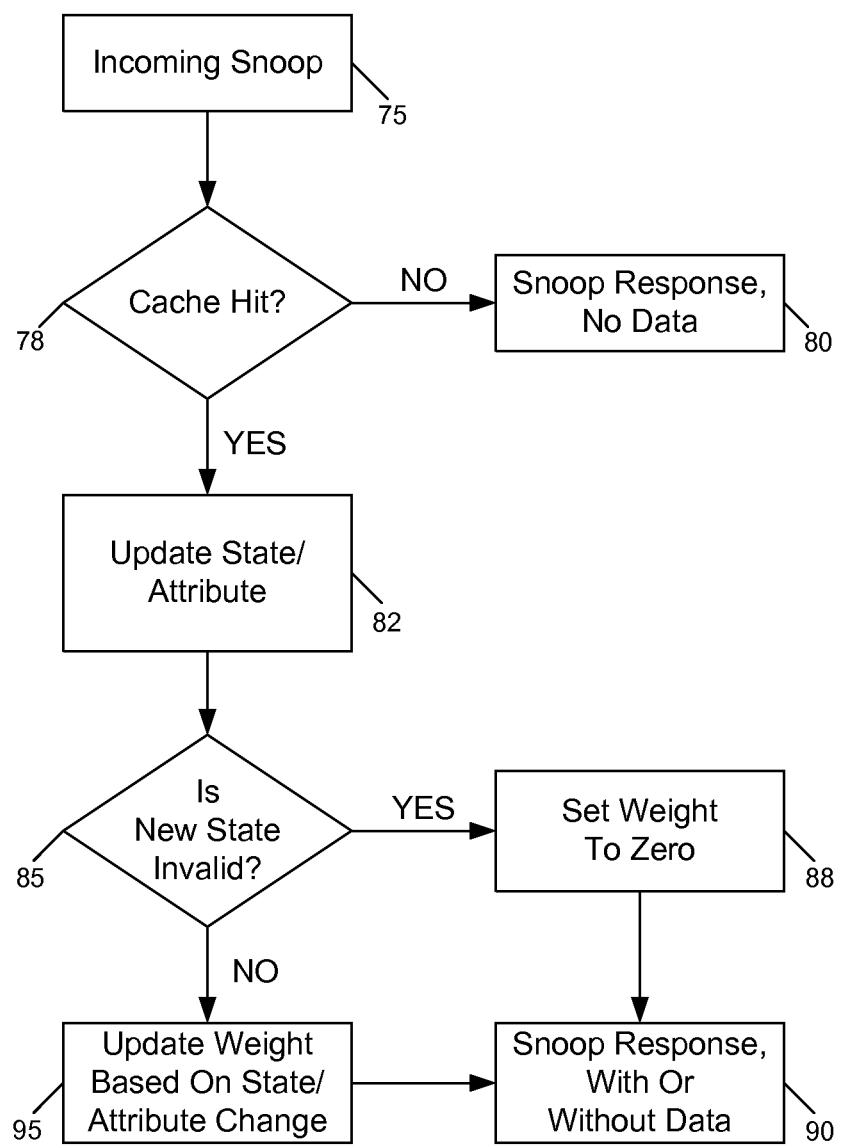
FIG. 2 is a flow diagram of a method for handling a snoop request in accordance with an embodiment of the present invention.

Referring now to FIG. 2, shown is a flow diagram of a method for handling a snoop request in accordance with an embodiment of the present invention. As shown in FIG. 2, method 70 may be for handling incoming snoop requests in a cache memory, and may begin by receiving the snoop request (block 75). Method 70 may be implemented using cache controller logic, as discussed above. The incoming snoop request may include an identifier of a given cache line. Accordingly, it may be determined whether a cache hit occurs (diamond 78). If not, control passes to block 80 where the cache controller may provide a snoop response indicating no data. Otherwise if the snoop request results in a cache hit, control passes to block 82. At block 82, a state/attribute of the cache line may be updated. This updating may be based on a given cache coherency protocol. For example, in a MESI protocol a cache line may be invalidated if a snoop request is for an exclusive access to the line. Or if the request is simply to read the line, the state may be updated to shared, if it is not already in that state. Control then passes to diamond 85, where it may be determined whether the new state is the invalid state. If so, the weight value for that line may be set to zero (block 88) and a snoop response may be provided (block 90), with or without the data. Otherwise if the updated state is not invalid, the weight of the cache line may be updated if a state/attribute change has occurred (block 95). Control then passes to block 90 to provide the snoop response. While shown with this particular implementation in the embodiment of FIG. 2, understand the scope of the present invention is not limited in this regard.

By taking into account the relative importance of cache lines across several cores, techniques in accordance with an embodiment of the present invention may result in more optimal allocation of on-die cache resource. For instance, without an embodiment of the present invention, if the same group of cache lines is used by multiple cores actively, these cache lines are replicated in all caches, resulting in the reduction of effective cache capacity. Instead, weighting according to an embodiment of the present invention recognizes constructive sharing and biases duplicate cache copies toward eviction. The net result is that single copies, which if lost, require a trip to main memory, are retained for a longer period of time. As memory accesses are much more expensive (performance and power) than accessing a remote on-die cache, a cache allocation policy can be implemented accordingly. However, a static policy that only eliminates cache line duplication would end up storing stale data. To avoid this shortcoming, embodiments may further detect stale copies and mark them as less critical. In other words, embodiments may use a combination of both data criticality and recency to optimize cache resources.

Figure 3:
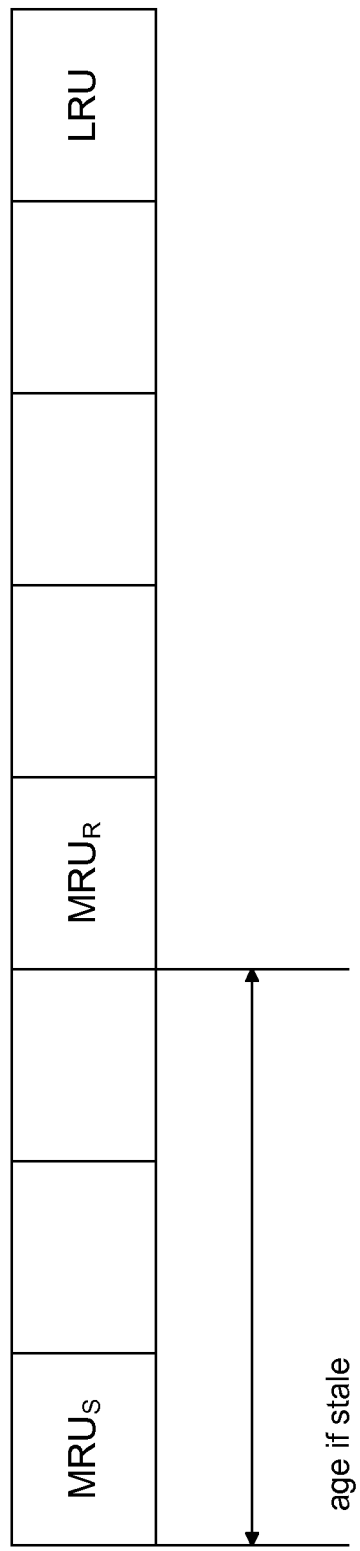
FIG. 3 is a block diagram of a replacement technique in accordance with one embodiment of the present invention.

The operations described above with regard to the flow diagram of FIG. 1 can be visualized using a virtual scan chain. Referring now to FIG. 3, shown is a virtual scan chain in accordance with one embodiment of the present invention. MRU indicates most recently used and LRU indicates least recently used. Rather than a conventional LRU-like scheme which replaces a cache line in the LRU position to make room for a newly accessed line, embodiments may provide for a so-called multi-level LRU scheme. In a single-level LRU scheme, after an eviction all remaining lines are shifted right (logically) and a newly fetched line is inserted in the MRU position. The newly inserted line has to make it all the way to the LRU position before it is evicted. If there is a cache hit somewhere along the chain, the line accessed will be moved back to the MRU position.

In a replacement technique in accordance with one embodiment of the present invention, multiple logical MRU positions ($MRU_S$, $MRU_R$ etc. as shown in FIG. 3) may be provided. The weight field acts as a proxy for the position in the scan chain. That is, lines with higher weight occupy positions to the left of the chain. Highest priority lines will have a larger weight and hence they will be inserted at the head (towards left) of the scan chain (i.e., $MRU_S$). Lines with intermediate priority may have a smaller weight and hence may be inserted somewhere in the middle of the chain (e.g., $MRU_R$). The exact position is determined by assigned weight. Lines with least importance may be inserted close to or at the LRU position. Since cache residence is a function of position in the scan chain, lines with a higher weight naturally stay in the cache longer.

For instance, if an intermediate priority line is accessed after it moves to the right of the $MRU_R$ position, it will be inserted back to the $MRU_R$ position instead of the MRU position. This guarantees that higher priority lines continue to maintain their relative importance. A highest priority line inserted at $MRU_S$, if a stale line, may be moved to the right, towards the LRU position. In one embodiment, the weights of non-accessed lines may be decremented within a cache set. Hence a line in the $MRU_S$ position will gradually be downgraded and after some time moves to the right of the $MRU_R$ position, making it relatively less important compared to intermediate priority lines. This recency and cache line relative importance may be combined to adaptively downgrade stale lines.

Note also that invalid lines may have their weight set to 0, which is akin to moving invalid lines to the LRU position. Using an embodiment of the present invention, off-die memory bandwidth traffic (data) can be reduced. Further, for applications that have a high percentage of shared data which is replicated in multiple caches, an embodiment may enable controlled replication and bias duplicate lines for eviction, resulting in more efficient cache utilization.

Figure 4:
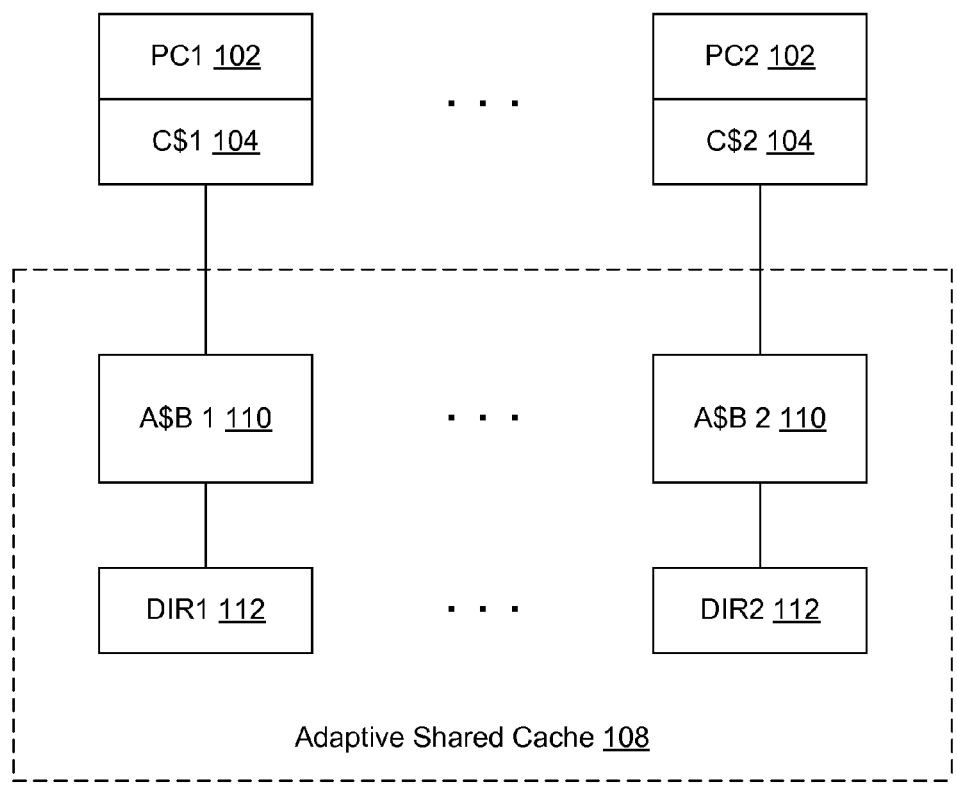
FIG. 4 is a block diagram of a chip multiprocessor (CMP) in accordance with one embodiment of the present invention.

As described above, some embodiments may be used in an adaptive cache structure. A CMP may have a number of processors on a single chip each with one or more caches. These caches may be private caches, which store data exclusively for the associated core, or shared caches, which store data available to all cores. Referring now to FIG. 4, shown is a block diagram of a CMP in accordance with one embodiment of the present invention. A CMP 100 may include a plurality of processor cores 102 on a single chip. A core 102 may be a processor, a coprocessor, a fixed function controller, or other type of processing core. Each core 102 may be coupled to a core cache 104 which may be a lowest level cache memory.

Core 102 may further be coupled to a shared cache 108. The shared cache 108 may be accessible to all cores 102. Any core 102 may allocate a line in shared cache 108 for a subset of addresses. The shared cache 108 may have a separate adaptive cache bank 110 for each core 102. Each adaptive cache bank 110 may have a directory (DIR) 112 to track the cache data blocks stored in core cache 104 and the adaptive cache bank 110. In addition, shared cache 108 may include cache controller logic to handle replacements in accordance with an embodiment of the present invention. While not shown in FIG. 4, in some implementations a private cache may be coupled between each of core caches 104 and shared cache 108.

In various embodiments, shared cache 108 may be an adaptive cache that may act as a private cache, a shared cache, or both at any given time. An adaptive cache may be designed to simultaneously offer the latency benefits of a private cache design and the capacity benefits of a shared cache design. Additionally, the architecture may also allow for run time configuration to provide either a private or shared cache bias. In this way, a single cache design may act either as a private cache, a shared cache, or a hybrid cache with dynamic allocation between private and shared portions. All cores 102 may access shared cache 108. A local core 102 may allocate a line of the corresponding adaptive cache bank 110 for any address. Other cores 102 may allocate a line of the adaptive cache for a subset of addresses. The adaptive cache may allow a line to be replicated in any adaptive cache bank based on local core requests. In one embodiment, local core 102 may access an adaptive cache bank before going through a coherency protocol engine. Other cores 102 may access the adaptive cache bank via the coherency protocol engine.

The cache organization may use a tiled architecture, a homogenous architecture, a heterogeneous architecture, or other CMP architecture. The tiles in a tiled architecture may be connected through a coherent switch, a bus, or other connection. A CMP tile may have one or more processor cores sharing a cache. The processor core may access via a cache controller an adaptive cache bank that is dynamically partitioned into private and shared portions. The CMP tile may have a directory to track all private cache blocks on die. The cache controller may send incoming core requests to the local adaptive cache bank, which holds private data for that tile. The cache protocol engine may send a miss in the local adaptive cache bank to a home tile via an on-die interconnect. The adaptive cache bank at the home tile, accessible via the on-die interconnect, may satisfy a data miss. The cache protocol engine may look up the directory bank at the home tile to snoop a remote private adaptive cache bank, if necessary. A miss at a home tile, after resolving any necessary snoops, may result in the home tile initiating an off-socket request. An adaptive cache bank configured to act purely as a private cache may skip an adaptive cache bank home tile lookup but may follow the directory flow. An adaptive cache bank configured to act purely as a shared cache may skip the local adaptive cache bank lookup and go directly to the home tile. The dynamic partitioning of an adaptive cache bank may be realized by caching protocol actions with regard to block allocation, migration, victimization, replication, replacement and back-invalidation.

Figure 5:
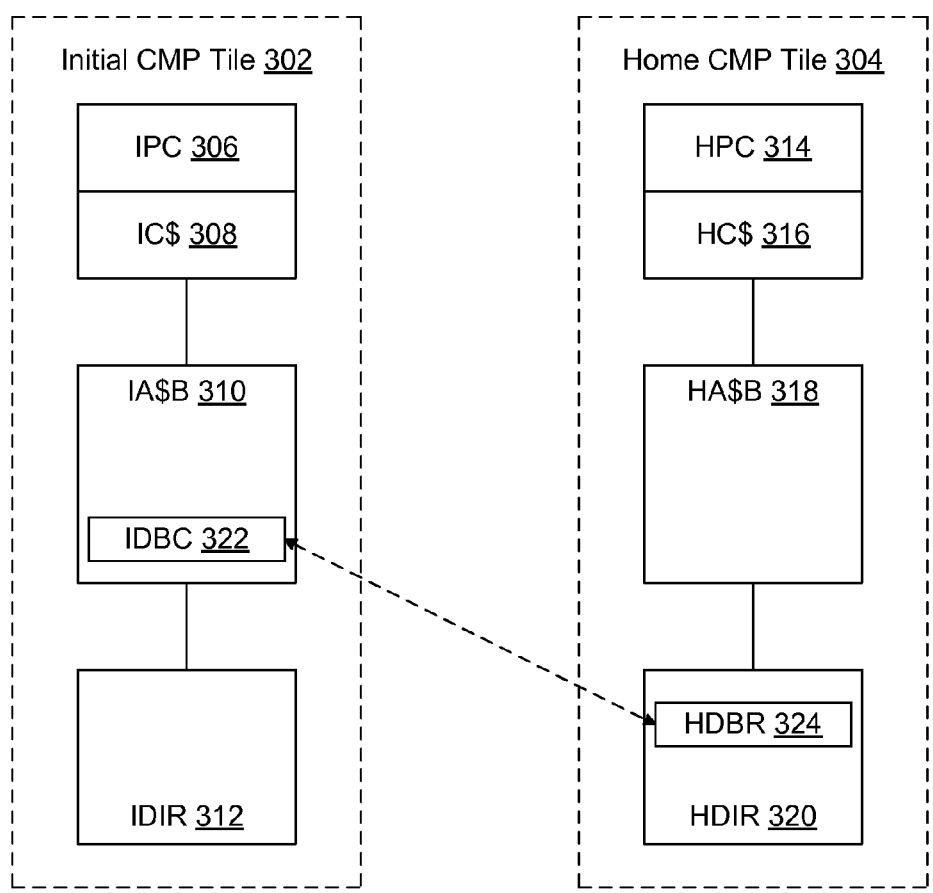
FIG. 5 is a block diagram of a CMP with an adaptive cache architecture in accordance with one embodiment of the present invention.

FIG. 5 illustrates in a block diagram one embodiment of a CMP with an adaptive cache architecture 300. An initial CMP tile 302 may request access to a data block after checking the home CMP tile 304 for that data block. The initial CMP tile 302 may have an initial processing core 306, an initial core cache 308, an initial adaptive cache bank 310, and an initial directory 312. The home CMP tile 304 may have a home processing core 314, a home core cache 316, a home adaptive cache bank 318, and a home directory 320. The initial CMP tile 302 may store an initial data block copy 322, or cache block, in the initial adaptive cache bank 310. The home CMP tile 304 may register a home data block registration 324 in the home directory 320 to track the copies of the data block 322 in each adaptive cache bank.

Figure 6:
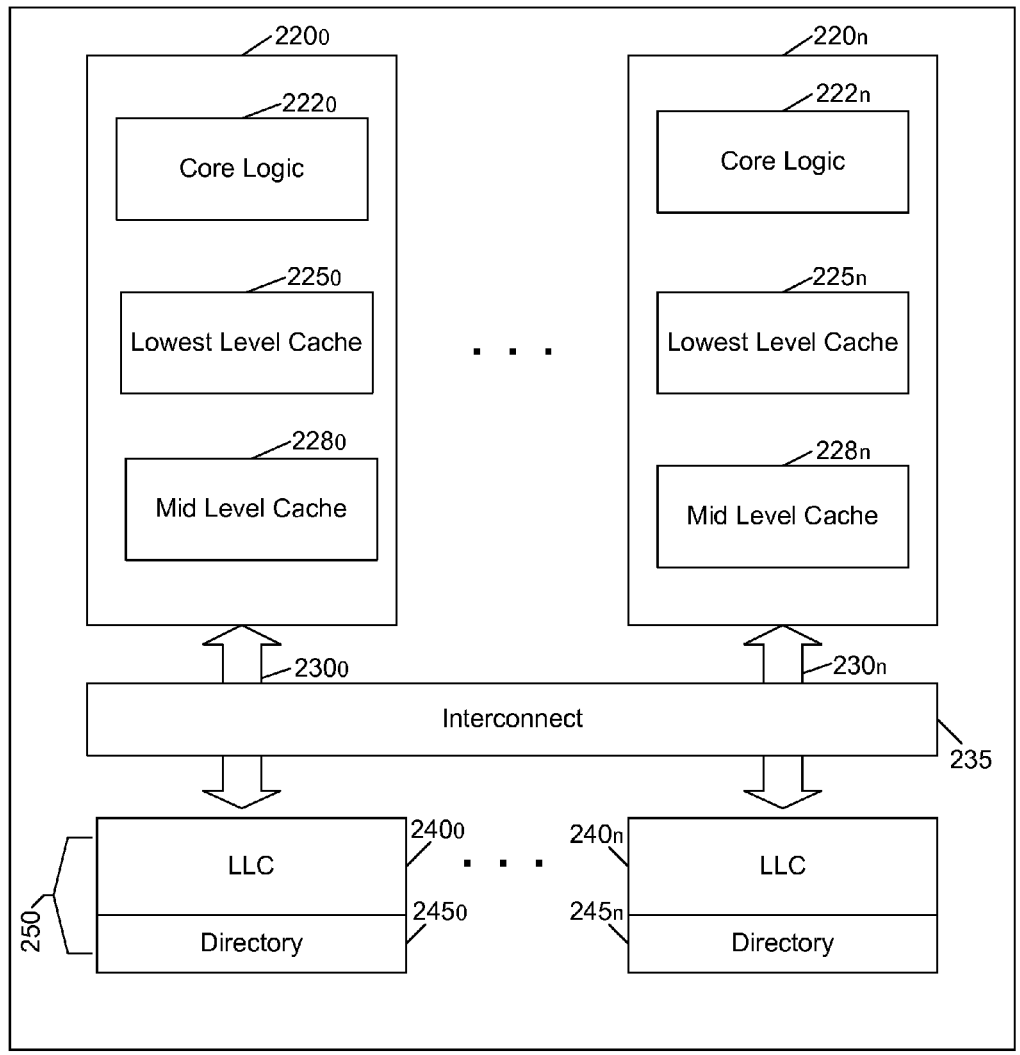
FIG. 6 is a block diagram of a processor in accordance with one embodiment of the present invention.

In other embodiments, a cache architecture may be an inclusive cache hierarchy. Referring now to FIG. 6, shown is a block diagram of a processor in accordance with one embodiment of the present invention. As shown in FIG. 6, processor 200 may be a multi-core processor including a plurality of processor cores $220_0$-$220_n$ (generically core 220). As shown in FIG. 6, in addition to core logic $222_0$-$222_n$ (generically core logic 222), each core may include multiple levels of a cache hierarchy. Specifically, each core 220 may include a lowest-level cache $225_0$-$225_n$ (generically cache 225). In one embodiment, cache 225 may correspond to an L1 cache, although the scope of the present invention is not so limited. Each core 220 may further include a mid-level cache $228_0$-$228_n$ (generically cache 228). Mid-level cache 228 may correspond to an L2 cache, in some embodiments.

Processor 200 may further include a last-level cache (LLC) 250 formed of a plurality of banks $240_0$-$240_n$ (generically bank or portion 240). LLC 250 may be a higher-level cache coupled to cores 220 via an interconnect 235, and which may include copies of the data present in the lower-level caches. As shown in FIG. 5, each core 220 may be coupled to interconnect 235 via a link $230_0$-$230_n$ (generically link 230). LLC 250 may act as a shared memory that is shared among the various cores 220 within processor 200. In contrast, the multi-level cache (MLC) hierarchy including lowest-level cache 225 and mid-level cache 228 may be formed of private caches, in which data is stored only for the associated core 220.

During operation, memory requests from execution units of a given core (which may be part of core logic 222) may first access the lowest level of the cache hierarchy before looking up any other caches within a system. Accordingly, for improved performance frequently accessed data may be present in the lowest possible cache level, i.e., cache 225. If the requested data is not present in cache 225, cache 228 may next be accessed to determine if the data is present there. In the embodiment shown in FIG. 6, each mid-level cache 228 is a final lookup point for each core 220 before a request is issued to LLC 250. LLC 250 may further include directory portions $245_0$-$245_n$ (generically directory portion 245) that each may be associated with a portion 240 of LLC 250, and may even include cache controller logic to handle replacements in accordance with one embodiment of the present invention. While described with this particular embodiment in the embodiment of FIG. 6, it is to be understood that the scope of the present invention is not so limited and processors may have different configurations in other embodiments.

Figure 7A:
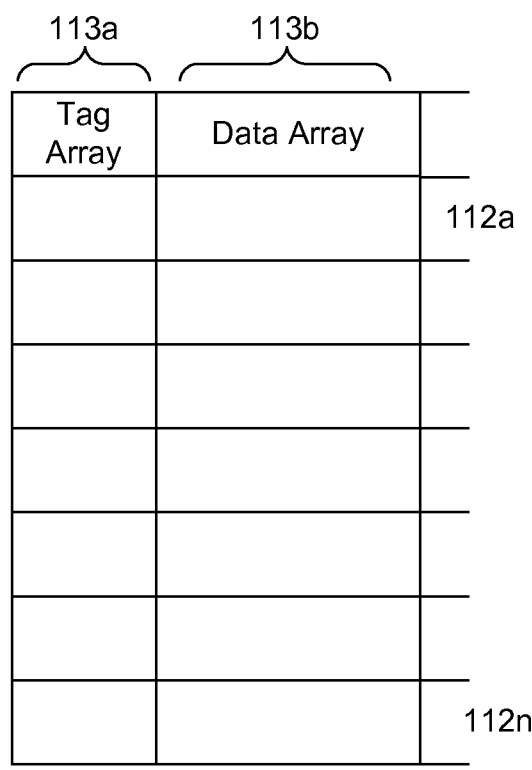
FIG. 7A is a block diagram of a cache memory in accordance with an embodiment of the present invention.
Figures 7B, 7C:
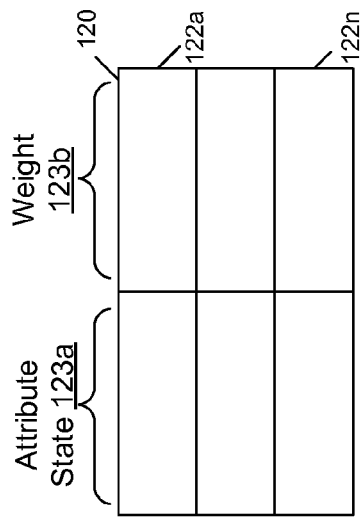
FIG. 7B is a block diagram of a tag entry in accordance with one embodiment of the present invention.
FIG. 7C is a block diagram of a weight table in accordance with one embodiment of the present invention.

Regardless of the cache architecture used, generally a cache memory will include a tag array and a data array. Referring now to FIG. 7A, shown is a block diagram of a cache memory in accordance with an embodiment of the present invention. As shown in FIG. 7A, cache memory 110 may include a plurality of entries or cache lines $112_a$-$112_n$. As seen, each cache line 112 may include a tag field $113_a$ of a tag array and a data field $113_b$ of a data array. Data array $113_b$ may store data of the cache line (along with optional bits for error detection/correction), while tag field $113_a$ may store various tag information. FIG. 7B is a block diagram of a tag entry in accordance with one embodiment of the present invention. As shown in FIG. 7B, tag entry 113 includes a tag address field 114, which may be used to index into the corresponding data array $113_b$, a state field 115 which may store the cache coherency state for the corresponding line, a weight field 116, which may be a weight counter to store a weight value in accordance with an embodiment of the present invention, and an attribute field 117, which may store optional attribute information associated with a line such as criticality information, e.g., received from a programmer or compiler. In at least one embodiment of the present invention, coherency state can be used as a proxy for the optional attribute field. As seen in FIG. 7B, a first entry is for data of a shared state, and more particularly to a single data element shared by multiple cores and thus this entry is associated with a highest priority. A next entry is in a modified state and has a next higher priority. Finally the last line is in a shared but duplicate state and thus has a lowest priority. Understand the particular priority values are shown for example, to demonstrate the relative priority above.

To determine an appropriate weight value for a given line, reference to a weight table may be made by a cache controller or other logic upon insertion or updating of a state (or attribute) of a line. Referring now to FIG. 7C, shown is a block diagram of a weight table in accordance with one embodiment of the present invention. As shown in FIG. 7C, weight table 120 may include a plurality of entries $122_a$-$122_n$. Each entry may include an attribute/state field $123_a$ and a weight field $123_b$. For each weight/attribute combination, a corresponding default weight value may be provided. These default weight values may be hard-coded or programmable, either statically or dynamically. In some embodiments, weight table 120 may be implemented using registers such as machine status register (MSRs) or configuration status registers (CSRs). By enabling programmability of such default weights, embodiments may programmably set weight values for a given type of application. For example, for a cache memory for use in one market segment, a first set of default weight values may be determined, while for a different market segment, a different set of programmable weight values may be determined. In one embodiment, such different weight values may be determined based on empirical testing of different test programs for data usage in different market segments.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a cache memory comprising an adaptive shared cache memory comprising a plurality of banks each to be associated with a corresponding core and to provide private cache storage and shared cache storage, the cache memory including a plurality of cache lines each having a data field to store data and a tag field including a state portion to store a cache coherency state of the corresponding data and a weight portion to store a weight corresponding to a relative importance of the corresponding data, wherein the weight is based at least in part on the cache coherency state and is reflective of a relative cost of acquisition of a cache line including the corresponding data, the relative cost comprising a cost ratio according to a miss latency for acquisition of the cache line, and wherein a first cache line in a shared state is to be given a higher weight than a second cache line in the shared state based at least in part on a number of copies of the first cache line in the cache memory and a number of copies of the second cache line in the cache memory.

2. The processor of claim 1, wherein the weight is further based on recency of usage of the corresponding data.

3. The processor of claim 2, wherein the weight is further based on attribute information associated with the corresponding data.

4. The processor of claim 3, wherein the tag field further includes a weight field to store the weight and an attribute field to store the attribute information.

5. The processor of claim 3, wherein the attribute information comprises a priority of an application to access the corresponding data, wherein the application is to execute in a virtual machine architecture.

6. The processor of claim 1, further comprising a cache controller to select a cache line of the plurality of cache lines for replacement based on the corresponding weights of the cache lines.

7. The processor of claim 6, wherein the cache controller is to update a weight for a cache line when the corresponding data is accessed, wherein the update is to increment the weight to a value corresponding to the cache coherency state of the cache line and to decrement a weight of at least one other cache line.

8. The processor of claim 7, wherein if at least one cache line of the plurality of cache lines has a weight corresponding to a minimum weight no decrement of the weight of the at least one other cache line occurs.

9. The processor of claim 6, wherein the cache controller is to access the weight using a weight table based on the attribute information or a cache coherency state of the cache line, the weight table including a plurality of entries each associating a weight with attribute/cache coherency state information, to provide the weight for a cache line inserted into the cache memory.

10. The processor of claim 1, wherein the first cache line in the shared state is to be given the higher weight than the second cache line in the shared state when a single copy of the first cache line is present in the adaptive shared cache memory and a plurality of copies of the second cache line is present in the adaptive shared cache memory, and a third cache line in a modified state is to be given a higher weight than the second cache line and a lower weight than the first cache line.

11. A method comprising:
selecting a line of a plurality of lines of a set of a cache memory having a lowest weight as a victim, wherein each line has a weight corresponding to a criticality of the line, the criticality based at least in part on of a cache coherency state of data stored in the line and an access recency of the line, and wherein the weight is reflective of a relative cost of acquisition of the line according to a miss latency for acquisition of the line, the relative cost of acquisition comprising a cost ratio and wherein a second line in a shared state is to be given a higher weight than the selected line in the shared state when a single copy of the second line is present in the cache memory and a plurality of copies of the selected line is present in the cache memory;
fetching data responsive to a request and storing the data in the selected line; and
determining a weight for the selected line based on the cache coherency state of the data stored in the line, and storing the weight in a weight field of the line.

12. The method of claim 11, further comprising upon a cache hit to the line, restoring the weight if a cache coherency state of the line does not change.

13. The method of claim 12, further comprising determining if any lines of the set have a weight of zero.

14. The method of claim 13, further comprising decrementing non-accessed lines of the set if none of the lines have a zero weight, and not decrementing non-accessed lines of the set if at least one of the lines has a zero weight.

15. The method of claim 11, further comprising receiving attribute information with the request, the attribute information indicating importance of the data.

16. The method of claim 15, further comprising determining the weight using a weight table based on the attribute information and a cache coherency state of the line, the weight table including a plurality of entries each associating a weight with an attribute and cache coherency state combination.

17. The method of claim 15, wherein the attribute information is obtained from a user-level instruction of an instruction set architecture associated with the request.

18. A system comprising:
a multicore processor including a plurality of processor cores and a shared cache memory having a plurality of banks each associated with one of the processor cores, wherein each bank is to provide private cache storage and shared cache storage, and includes a plurality of cache lines each having a data field to store data and a tag field including a state portion to store a cache coherency state of the corresponding data, and a weight field to store a weight based on the cache coherency state of the corresponding data and a recency of access to the cache line, wherein a first weight is to be assigned to a first cache coherency state, a second weight is to be assigned to a second cache coherency state, and a third weight is to be assigned to a third cache coherency state, wherein the first cache coherency state is a shared state in which a first cache line includes data shared by at least some of the plurality of processor cores, the second cache coherency state is a modified state, and the third cache coherency state is a shared state in which the first cache line includes data duplicated in multiple cache lines.

19. The system of claim 18, wherein the tag field further comprises an attribute field to store attribute information associated with the data, wherein the weight is further based on the attribute information.

20. The system of claim 18, wherein a first cache line in a shared state is to be given a higher weight than a second cache line in the shared state when a single copy of the first cache line is present in the shared cache memory and a plurality of copies of the second cache line is present in the shared cache memory, and a third cache line in a modified state is to be given a higher weight than the second cache line and a lower weight than the first cache line.

\* \* \* \* \*